No. 840,203. PATENTED JAN. 1, 1907.
G. W. DONNING.
FEEDING MECHANISM.
APPLICATION FILED APR. 26, 1902.
6 SHEETS—SHEET 1.
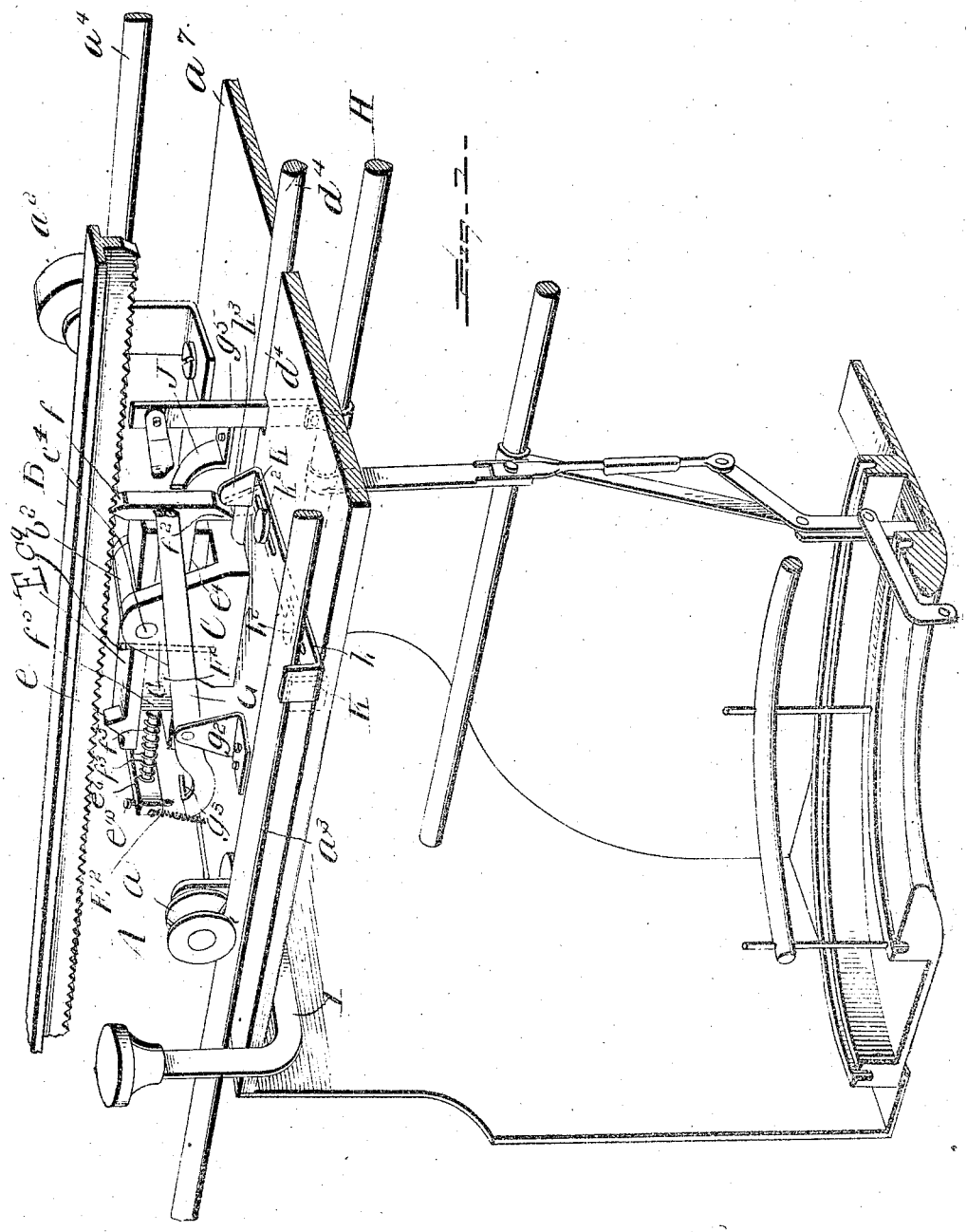
WITNESSES:
INVENTOR

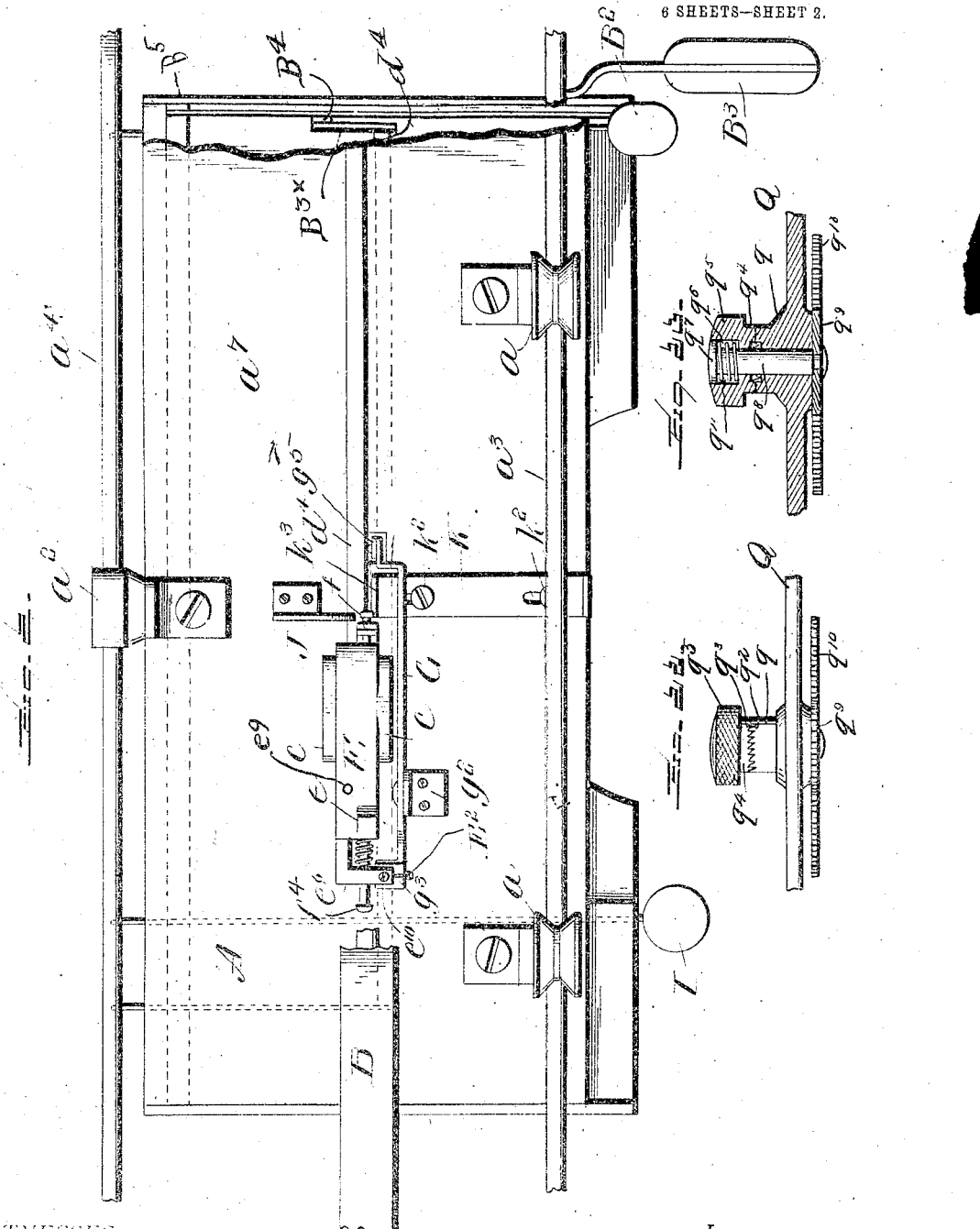

No. 840,203. PATENTED JAN. 1, 1907.
G. W. DONNING.
FEEDING MECHANISM.
APPLICATION FILED APR. 26, 1902.
6 SHEETS—SHEET 3.
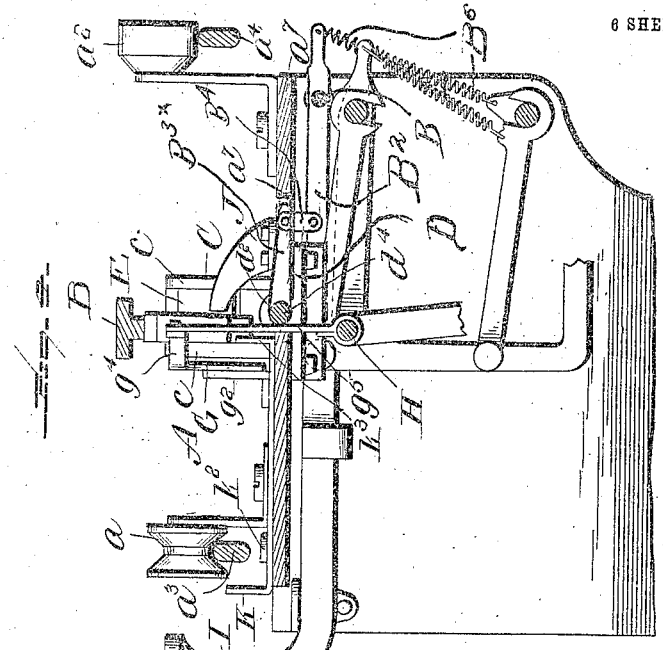
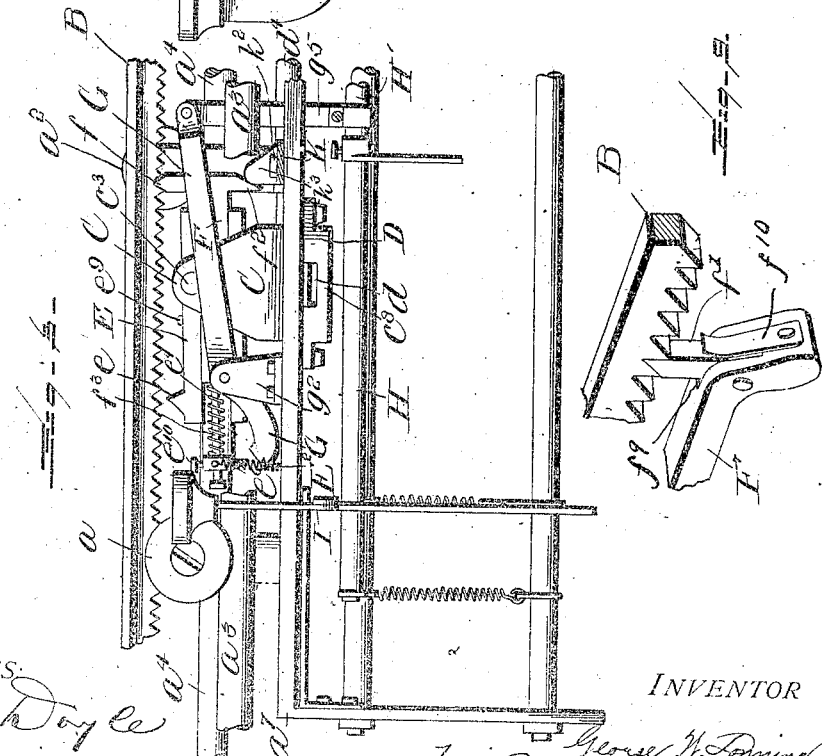
WITNESSES:
INVENTOR

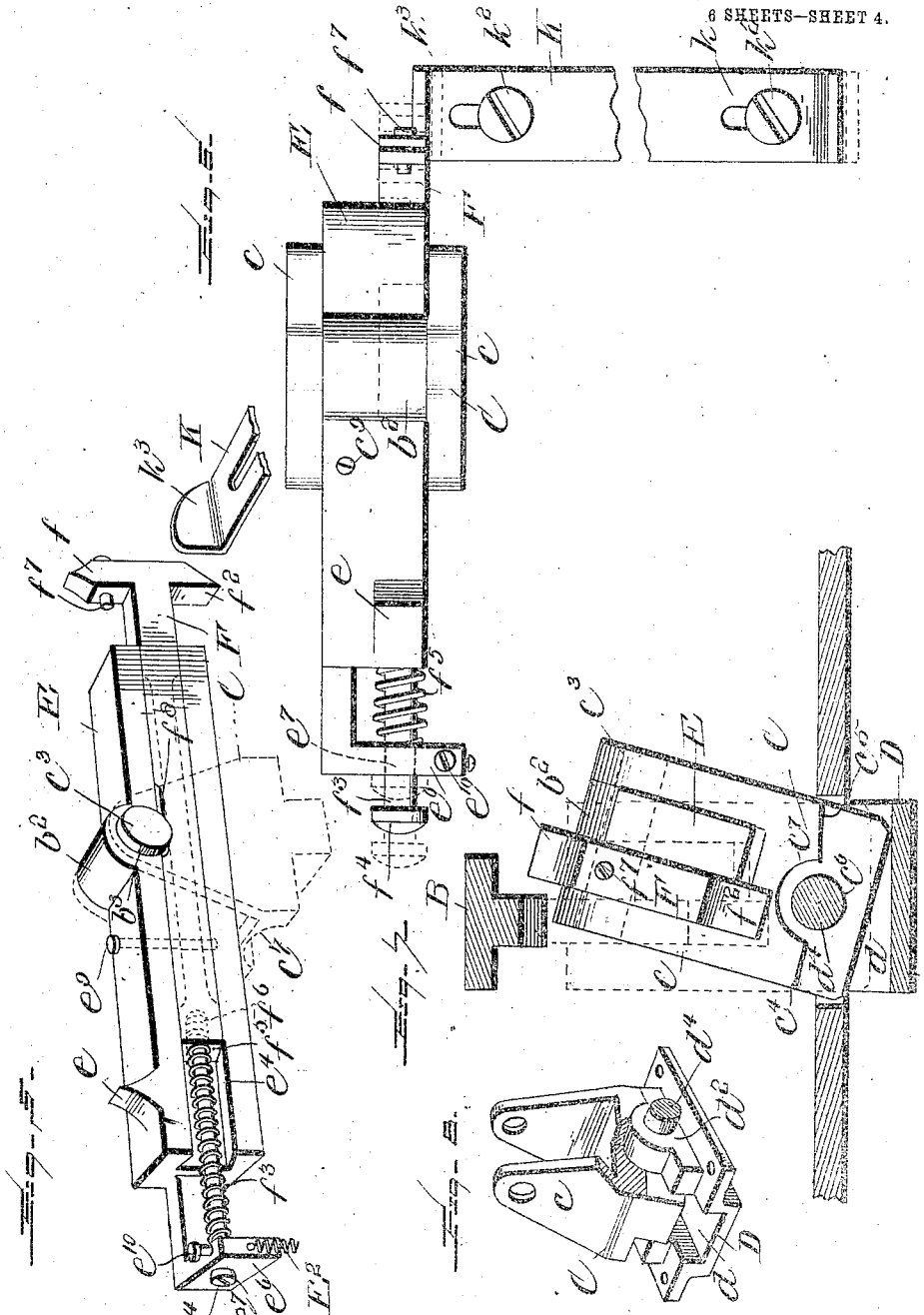

No. 840,203. PATENTED JAN. 1, 1907.
G. W. DONNING.
FEEDING MECHANISM.
APPLICATION FILED APR. 26, 1902.
6 SHEETS—SHEET 5.
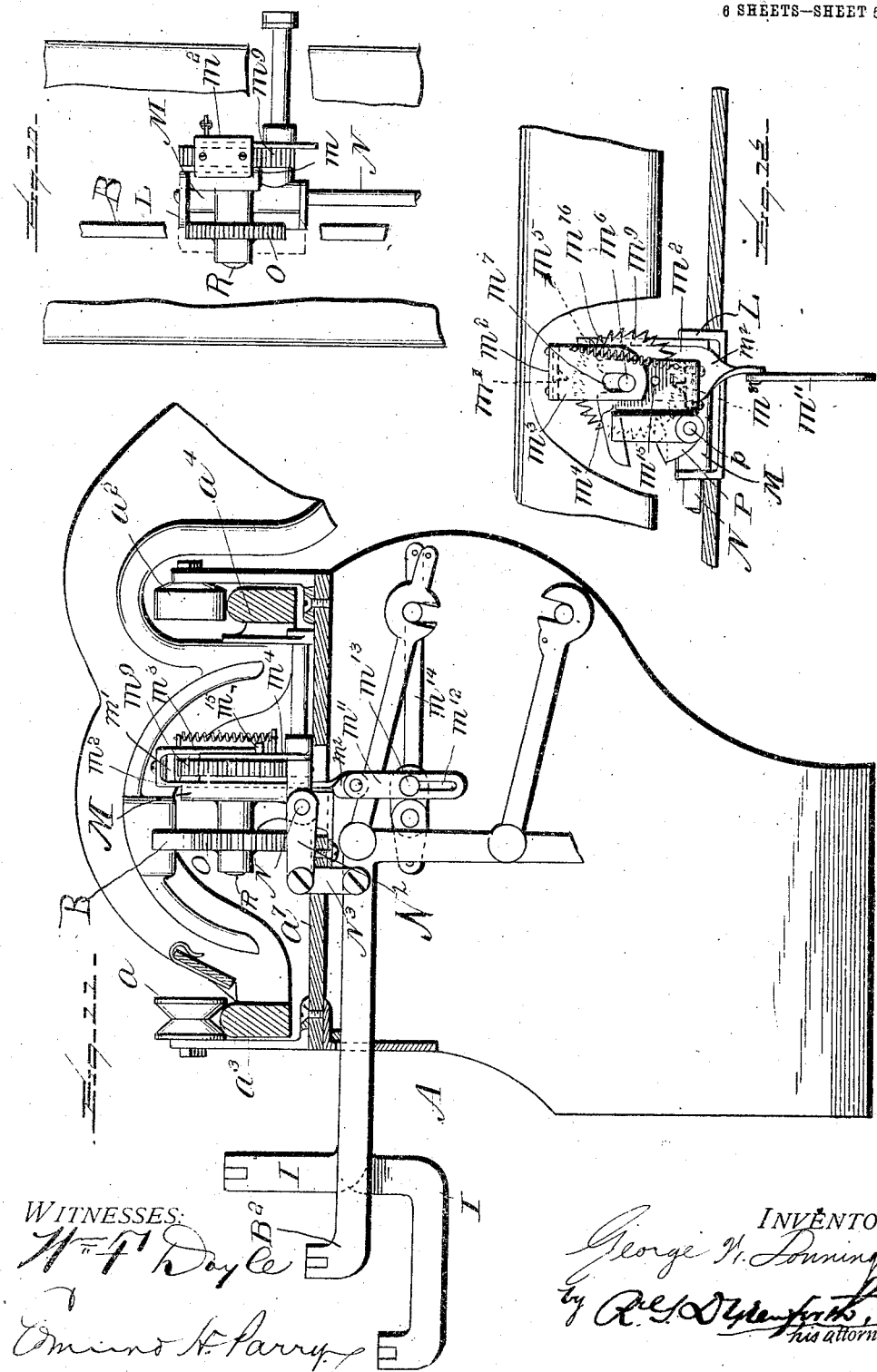

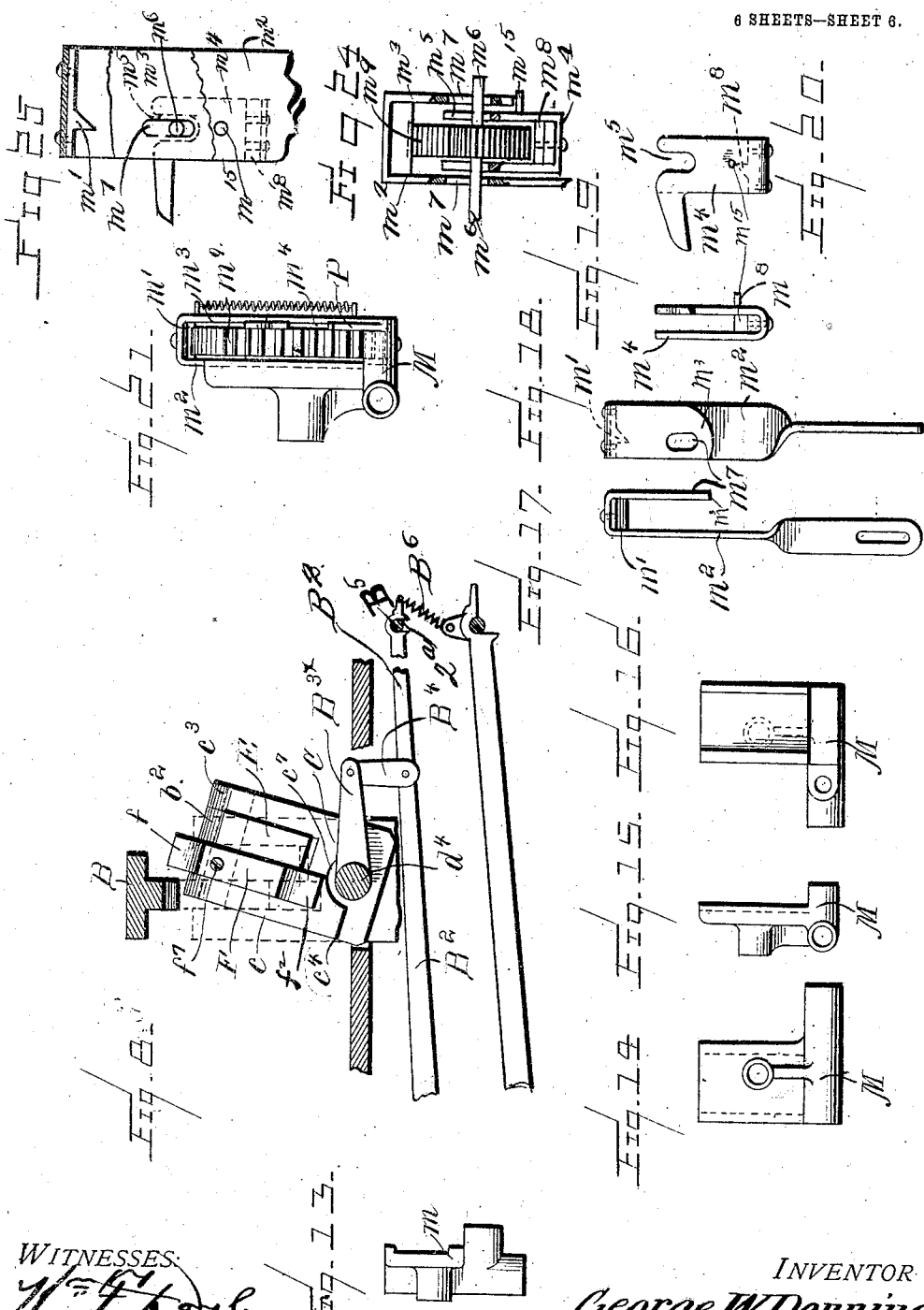

UNITED STATES PATENT OFFICE.

GEORGE W. DONNING, OF EAST ORANGE, NEW JERSEY, ASSIGNOR TO HARRY T. AMBROSE, OF ORANGE, NEW JERSEY.

FEEDING MECHANISM.

No. 840,203.   Specification of Letters Patent.   Patented Jan. 1, 1907.

Application filed April 26, 1902. Serial No. 104,843.

*To all whom it may concern:*

Be it known that I, GEORGE W. DONNING, a citizen of the United States, residing at East Orange, in the county of Essex and State of New Jersey, have invented certain new and useful Improvements in Feeding Mechanism; and I do hereby declare the following to be a full, clear, and exact description of the invention, such as will enable others skilled in the art to which it appertains to make and use the same.

My invention relates to an improved mechanism for producing an intermittent movement which is especially adapted for use in writing-machines; and it consists in the constructions, combinations, and arrangements herein described and claimed.

The objects of my invention are to provide an improved mechanism for producing intermittent movement in a part which can be thrown out of engagement to permit total release of the part for free movement and which can be conveniently and quickly adjusted to vary the extent of the intermittent movements.

While my invention has a wide field and is adapted to parts in general requiring an intermittent motion, it is especially adapted to writing-machines.

Referring to the accompanying drawings, forming a part of this application, and in which similar reference-symbols indicate corresponding parts in the several views, Figure 1 is a perspective view with parts omitted, illustrating one embodiment of my invention applied to a flat-platen type-writer. Fig. 2 is a plan view of the parts shown in Fig. 1. Fig. 3 is a detail front elevation illustrating the escapement mechanism and its coöperating parts. Fig. 4 is a transverse sectional elevation of the parts shown in Fig. 3. Fig. 5 is a detail perspective view showing the arrangement of the rocker-block and dog-block. Fig. 6 is a top plan view of the parts shown in Fig. 5. Fig. 7 is a detail sectional view on a larger scale, illustrating the arrangement of the trunnion-plate, the bearing-yoke, and the rocker and dog blocks when positioned for general release, the normal perpendicular position of the parts being indicated by broken lines. Fig. 8 is a detail perspective view, partly broken away, illustrating the arrangement of the trunnion-plate and bearing-yoke. Fig. 8ª is a view in side elevation, partly in section, of the dog-mechanism-tilting device. Fig. 9 is a detail perspective view illustrating a modified form of feed rack and dog mechanism. Fig. 10 is a detail plan view illustrating a modified construction. Fig. 11 is a sectional elevation showing the construction of Fig. 10 applied to a type-writer, and Fig. 12 is a detail rear elevation of the parts shown in Fig. 10. Figs. 13, 14, 15, and 16 are detached views, respectively in plan, front elevation, side elevation, and rear elevation, of the rocking bracket of the modification shown in Figs. 10, 11, and 12. Figs. 17 and 18 are detached views, respectively in side and rear elevation, of the rigid dog-plate; and Figs. 19 and 20 are detached views, respectively in side and rear elevation, of the loose dog-plate; and Fig. 21 is an end view of the device shown in Fig. 12; and Figs. 22 and 23 are views, respectively in elevation and section, of a form of device for effecting tensioning of the power-spring for moving the carriage. Figs. 24 and 25 are detail views of certain parts assembled of the modified form of device illustrated in Figs. 10 to 12.

Referring to the drawings, A indicates a carriage, shown provided with two front rollers $a$, arranged to travel on a track or guide-rail $a^3$, and with a single cylindrical rear roller $a^2$, traveling on a track, $a^4$. The tracks and rollers may be adjustably supported, and obviously any desired number of rollers may be employed. In the construction illustrated the tracks $a^3$ and $a^4$, are supported on standards which are provided with means for moving them longitudinally to produce line-spacing, as described in my copending application, Serial No. 104,842, and the feed-rack B, preferably adjustably mounted on said standards, is shown extending above the carriage A.

The escapement, comprising a plate D, carrying trunnions $d^2$, is shown secured to the under side of the top plate $a^7$ of the carriage. The trunnion-plate is preferably formed with a channel $d$ to permit limited movement of the bearing-block or yoke C, which is rigidly secured to a shaft $d^4$, journaled in said trunnions and extending to the right (see Fig. 2) sufficiently to permit its actuation, through intermediate mechanism, (presently to be described,) by a general-release lever B². A handle B³ is shown attached to the carriage in position to be conveniently grasped by the operator for effecting movement of the carriage upon actuation of the general-release lever $B^2$.

The yoke C, shown provided with cylindrical recesses $c^7$, Fig. 7, constructed to turn on the trunnions $d^2$, carries inclined shoulders $c^5$ at one side of said recesses for permitting tilting of the yoke beyond a perpendicular position in that direction, and with shoulders $c^4$, extending radially at the other side of said cylindrical recesses and arranged to abut against the trunnions to limit the swing of the yoke in that direction to its normal perpendicular position, as shown more clearly in Figs. 7 and 8. A pin $c^3$, carried by the cheeks $c$ of the yoke C, rockingly supports a rocker-block E, which carries a tooth or rigid dog $e$, adapted to engage the feed-rack B. The pin $c^3$ is shown extending through a hub $b^2$, arranged somewhat toward one end of the rocker-block E, which is disposed loosely upon said pins $c^3$. A block F, shown slidably mounted in an undercut groove $e^4$ on the front side or face of the rocker-block, carries an upwardly-extending tooth $f$, which constitutes a loose dog or feeding-dog, and also a downwardly-disposed pointed head $f^2$. A spindle $f^3$, shown adjustably secured to the dog-block F, as by screw-threads $f^6$, extends through an opening $e^7$ in a bent extension $e^6$ on the rocker-block E and carries at its free end a head $f^4$ of greater size than said opening $e^7$. A spring $f^5$, surrounding the spindle $f^3$, is confined between the extension $e^6$ and the dog-block F and tends to maintain the latter in its normal right-hand position. (See especially Fig. 5.) An adjusting-screw $f^7$ is carried by the loose dog $f$ in position to engage the rocker-block E and provides means for regulating the travel of the dog-block F to the left. A depression $f^8$ across the upper face of the dog-block by reducing the extent of its bearing-faces acts to reduce friction.

While I prefer to form the groove $e^4$ in the front side of the rocker-block E with undercut walls for the purpose of preventing lateral movement of the dog-block, any other form of groove or seat could be employed and the cheeks $c$ of the yoke C depended upon to perform that function.

An adjusting-screw $e^9$, shown extending through the rocker-block E and somewhat removed from and back of the vertical plane of the back face of the block F, as more clearly appears in Figs. 2 and 6, in position to engage the yoke C, provides means for regulating the swing of the rocker-block about its pin $c^3$. A spring $E^2$, connected to the top plate $a^7$ and to the extension $e^6$ on the rocker-block, tends to maintain the latter in its normal position, with the adjusting-screw $e^9$ engaging the yoke C, and by such engagement of the adjusting-screw acts to maintain the yoke C in its normal perpendicular position, with the loose dog $f$ in engagement with the feed-rack B.

A lever G is provided for rocking the rocker-block E about its pin $c^3$ in order to bring the rigid dog $e$ into engagement with the feed-rack B and simultaneously release the loose dog $f$ from said rack. The lever G is fulcrumed on the standard $g^2$, carried by the top $a^7$, and is provided at its forward end with an offset $g^3$, adapted to engage an adjustable screw $e^{10}$ on the extension $e^6$ of the rocker-block E. The rear end of the lever G is connected by a flat link $g^5$ to the universal bar H of the type-writer, whereby the lever G will be actuated to rock the rocker-block E upon depression of any spacing or character keys, the depression of any of these keys acting to depress the universal bar.

Key-levers I for operating type-bars (not shown) are arranged to extend beneath the top plate $a^7$ and to contact with the universal bar H, so that the depression of any of such keys will operate the universal bar H and actuate the mechanism just described.

A guide J is shown secured to the top plate $a^7$ in position to engage the dog-plate F when the yoke C, with the dog-plate F, is rocked or tilted backward into general-release position, and thus prevents movement of the dog-plate F by the spring $f^5$, while the parts are maintained in the position of general release. By this construction the loose dog $f$ will be automatically guided to the proper tooth in the feed-rack B upon return of the yoke C to its normal perpendicular position and movement of the carriage beyond the point indicated on the guide-scale prevented. This is a very advantageous construction, in that without the guide J the dog-plate F would be moved to its extreme right-hand position under the action of the spring $f^5$ during the general release of the parts, and upon return of the yoke C to its normal perpendicular position the loose dog $f$ would permit motion of the carriage beyond the point indicated on the guide-scale until its stop $f^7$ engaged the rocker-block E.

It will now be seen that the dog mechanism thus described is arranged (by reason of its being supported by the yoke C and the rocker-block, constituting a part thereof) to have a plurality of movements—that is to say, it is capable of movement toward and away from the rack-bar in the same vertical plane and in horizontal alinement therewith when performing an upward-tilting movement for spacing and also a tilting or rocking movement—that is, in a direction transverse to the longitudinal vertical plane of the rack-bar for permitting free lateral travel of the carriage longitudinally of the feed-rack.

For spacing purposes the dog mechanism is rocked or oscillated in the plane corresponding to the plane of the sides of the rack-bar, and the movement is always in a plane in alinement with said sides whether they be vertical, or horizontal, or oblique. For general release, however, the direction of movement of the dog mechanism is approximately at right angles to the direction of oscillation of the mechanism for spacing—that is, perpendicularly to the axis of said dog mechanism. In the one case for spacing the dog mechanism is rocked on its axis extending at right angles to the length of the rack-bar, and the movement is to and away from the said rack-bar, so that the rigid and loose dogs of said mechanism are never out of alinement one with the other. For general release the dog mechanism is tilted on its axis extending in the same longitudinal direction as the rack-bar, and then both dogs are simultaneously ranged out of engagement with the rack-bar. I have therefore in the one construction mechanism having an oscillating movement in one direction for spacing and a tilting movement transverse to its direction of oscillation for general release. The oscillation is longitudinal of the rack-bar and the tilting is transverse thereof, with independent means engaging the dog mechanism to oscillate it and to tilt it, and with means for guiding the parts when being tilted out of engagement with the rack-bar.

A regulating-bar K, shown slidably secured to the top plate $a^7$ by screws $k^2$, is provided with a stop $k^3$, which is normally maintained in position for engaging the inclined face of the pointed head $f^2$ on the dog-block F. It will be clear that upon swinging of the rocker-block E about its pin $c^3$ to release the loose dog $f$ from the feed-rack D the dog-plate F will be projected to the right by the spring $f^5$ until its pointed head $f^2$ engages the stop $k^3$ and that upon return of the loose dog $f$ to engagement with the feed-rack B the type-writer carriage will be permitted to move a distance corresponding to that of the dog-plate F, previously regulated by the stop $k^3$. The stop $k^3$ does not effect any function beyond limiting the thrust of the loose dog-plate F. The bevel on the head $f^2$ is not long enough to permit further thrust of the plate and thus throw the dog out of a path properly to engage the rack-bar when being rocked into engagement therewith. For single spacing the bar K is in the position shown in full lines in Figs. 1, 2, and 6—that is, in position to be impinged by the head $f^2$, and thereby limit the thrust of the block F. When said bar is retracted to the position shown in dotted lines in Figs. 1 and 6, and thus the stop $k^3$ is out of the path of the head $f^2$, the block F will be permitted to have a greater thrust—that is, to a point beyond that to which it would be restricted by the engagement of the head $f^2$ with the stop $k^3$—so that the dog $f$ is positioned to engage the rack one point beyond that which it would engage when said engagement of the head $f^2$ and stop $k^3$ occurs, and double spacing is thus effected. The head on the adjusting-screw, engaging with the arm $e^6$, serves to limit the thrust of the block F beyond the desired point for such double spacing and in such operation serves in the same manner as the stop $k^3$—namely, to stop the movement of the block at a point to engage the tooth at the proper point in the rack. By this arrangement I provide means for varying the travel of said block F, and thus a means for changing the character of the spacing. It will be obvious that the stop $k^3$ by engaging the inclined face of the pointed head $f^2$ tends to maintain the rocker-block E in its normal position on the pin $c^3$, with the loose dog $f$ in engagement with the feed-rack D. It is also obvious that the stop $k^3$ could be stepped or otherwise formed to permit variation in the extent of that movement of the dog-plate F which is limited by said stop. The regulating-bar K may be provided with a finger-knob or other means to provide means for conveniently adjusting it on the top plate $a^7$ to bring any desired portion of the stop $k^3$ in the path of the pointed head $f^2$ or to remove said stop entirely from the path of said head. The regulating-stop $k^3$ thus provides a simple and convenient means for causing single spacing, double spacing, or a greater movement of the parts.

The parts are so constructed and arranged that the carriage may be "back-spaced" a distance to reposition it at the last space for striking a letter over that last struck or in that space where the type may not have printed. In other words, if the carriage A when the parts are in the position shown in Fig. 3 (with the loose dog $f$ engaging the rack B and the rigid dog disengaged) be pushed back by the operator's hand toward the left in a reverse direction to its regular feed the rocker-block E will be caused to slide on the dog-block F. This movement will cause the bent extension $e^6$ (extending from the left-hand end of the rocker-block E) to slide on the spindle $f^3$ (which is screwed into the left-hand end of the dog-block F) until it abuts against the head $f^4$. The rocker-block E has up to this moment occupied a place somewhat downwardly inclined from a longitudinal plane. Its fulcrum point is disposed slightly to the right of the center. Therefore when the bent extension strikes the head $f^4$ of the spindle $f^3$ it tends to force the said extension upward to elevate the left hand of said block E into a horizontal plane and in this operation rocks the rocker-block slightly, withdrawing the loose dog nearly (though not entirely) out of engagement with the feed-rack B and projecting the rigid dog E into partial engagement with the said feed-rack, but sufficiently to cause it to lock therewith. It is to be understood that in the regular forward-spacing movement the loose dog is rocked entirely out of engagement with the feed-rack, and the rocker-block E is thus rocked so that its right-hand end is downwardly inclined from a horizontal plane. The point now is to effect an engagement of both dogs with the feed-rack simultaneously, and this is permitted by reason, first, of the space for free movement between the bent extension $e^6$, as shown in Fig. 3, and the head $f^4$ of the spindle $f^3$, and, secondly, the slight rocking movement of the rocker-block E to throw the rigid dog into engagement with the feed-rack without entire disengagement of the loose dog therefrom. The two dogs being then in engagement with the rack, the whole mechanism becomes locked, so that a type-bar may be operated to print at the point back of that which would have been struck by the type had not the carriage been back-spaced.

The foregoing is one way by which the rocker-block E is rocked to effect an engagement of both dogs simultaneously with the feed-rack. This rocking of the block E is also effected (but only when the parts are set for single spacing) by the striking of the upturned end $k^3$ of the slide-plate K (carried by the top plate of the carriage) against the dependent piece $f^2$ on the dog-plate F, which piece, as shown, is beveled. This slide-plate is disposed relative to the loose dog about the same distance as the extent of movement of the bent extension $e^6$ on the spindle $f^3$. As will be seen by referring to Fig. 5, when the portion $k^3$ of the slide-plate K is brought against the beveled face of the piece $f^2$ it will tend to effect a rocking of the block E when the dog-block F slides thereon, as above described. This will withdraw the loose dog nearly out of engagement with the feed-rack and project the rigid dog thereinto. This back spacing of the carriage is of course done by the operator's hand and would be for one space unless the parts are set for "double" spacing, in which case the back spacing would be of two spaces. In this operation the spacing mechanism does not become disarranged, because as soon as the operator removes his hand from the carriage it will itself resume the position at which it had arrived previous to being back-spaced and be in position to print in the next space, since the loose dog will have been retained in the feed-rack and not caused a spacing of the carriage.

A crank-arm $B^{3\times}$ is mounted on the rock-shaft $d^4$, extends rearward therefrom, and has pivoted to its end a link $B^4$, connecting with the general-release lever $B^2$, as shown in Fig. 8ª. At its rear end the said lever is formed with an incut $2^a$, designed to engage a transverse rod $B^5$. To its extreme end is attached a retractile spring $B^6$, which is placed under stress when said lever is moved on its said fulcrum. It is to be understood that such movement of the lever actuates the link $B^4$ to depress the crank-arm $B^{3\times}$, and this in turn rocks the shaft $d^4$ to disengage the parts from the rock-bar. The spring $B^6$ serves by acting on the lever $B^2$ to return the parts to normal position, and thus constitutes a means for reshifting the dog mechanism into engagement with the feed-rack. At the same time the plate J serves to guide the dog mechanism into range of and in proper position for the loose dog, so that said dog will engage the rack.

The operation of my invention is as follows: The carriage is provided with suitable actuating means, such as the usual spring devices, for maintaining a force thereon tending to cause the carriage to travel from left to right. The normal position of the parts is that illustrated in Figs. 1 and 3, with the loose pawl $f$ engaging the feed-rack B and having its stop $f^7$ engaging the rocker-block E. Upon depression of the universal bar H the lever G engages the adjustable stop $e^{10}$ and rocks the rocker-block E about its pin $c^3$ to bring the rigid dog $e$ in engagement with the feed-rack B and to release the loose dog $f$ from said rack. In this position the dog-plate F will be projected to the right under the action of the spring $f^5$ until its pointed head $f^2$ engages the adjustable stop $k^3$. Upon return of the universal bar H to its normal position the spring $E^2$ will act to return the rocker-block E to its normal position, with the rigid dog $e$ withdrawn from the rack and with the loose dog in engagement therewith. The carriage-actuating means then causes movement of the carriage to the right until the rocker-block E is brought into contact with the stop $f^7$, carried by the loose dog $f$. The extent of such movement of the carriage can obviously be regulated by adjustment of the regulating-stop $k^3$. It will be noted that the lever G does not engage the stop $e^{10}$ to actuate the rocker-block E until after the universal bar H has completed part of its movement, thereby providing a construction in which the inertia of the universal bar and its connected parts is overcome before the additional load incident to operating the rocker-block E is encountered. This successive actuation of the parts provides a construction in which the keys can be operated by a very light touch and in which the kinetic energy stored in the parts first actuated will act to actuate those subsequently brought into operation. To permit free movement of the type-writer carriage, the total-release lever $B^2$ is depressed to rock the shaft $d^4$ and the yoke C, carried thereon, to the position shown in Fig. 7. In this position of the parts both dogs $e$ and $f$ are swung from engagement with the feed-rack B, and the carriage can be freely moved without the noise and wear inherent in those constructions in which the feed-dogs are not totally released from the rack.

Fig. 9 illustrates a modified construction of feed mechanism in which a loose dog $f'$ is pivotally supported on the dog-plate F, which latter is provided with a shoulder $f^9$, arranged to limit the swing of said dog in one direction, and with a spring $f^{10}$, tending to hold the dog against said shoulder. In this construction it is not necessary to employ the yoke C for swinging the block into position of general release, since the dog $f'$ is constructed to drag along the feed-rack during return of the type-writer carriage to position for starting a line. It is obvious that a loose pawl may be carried by the rocker-block E to prevent rebound of the moving parts.

Figs. 10, 11, and 12 and 13 to 20, inclusive, illustrate a modified construction in which a rocking bracket M is secured to a shaft N, journaled in a support L. A rigid dog-plate $m^2$, slidably mounted in the portion $m$ of the rocking bracket M and carrying a rigid dog $m'$, is provided with a portion $m^3$ depending from its top. A spindle R, journaled in the rocking bracket M, has rigidly secured thereto a gear-wheel O, meshing with a feed-rack B, and a ratchet-wheel $m^9$ in position to be engaged by the rigid dog $m'$. A pin $m^6$, carried by the ratchet-wheel $m^9$, extends through slots $m^7$ in the rigid dog-plate $m^2$ and through a yoke-shaped portion $m^5$ of a loose dog-plate $m^4$, which latter is movably supported between the rigid dog-plate $m^2$ and its depending portion $m^3$. The loose dog-plate $m^4$ is provided with a loose dog $m^8$, adapted to engage the ratchet-wheel $m^9$, and with a pin $m^{15}$, arranged to be engaged by the curved or inclined bottom face of the depending portion $m^3$ on the rigid dog-plate $m^2$, the position of the pin $m^{15}$ being sufficiently adjacent to the said curved face of the depending portion to be engaged thereby before the upper part of the slot $m^7$ would engage with the pin $m^6$. The shaft N, shown carrying a crank $N^2$, Fig. 11, and connected by a link $N^3$ to the general-release key $B^2$, provides means for rocking the bracket M in its support L sufficiently to swing the gear-wheel O out of engagement with the feed-rack B, thus producing general release of the parts for free movement of the type-writer carriage in either direction. The plate $m^2$ is pivoted to a link $m^{11}$, which latter is provided with a slot $m^{12}$, in which slides a stud $m^{13}$ on an arm $m^{14}$, which is actuated by the universal bar. This slotted-link connection provides a convenient and simple means for permitting swing of the rocking bracket M in its support L to the position of general release. It will thus be seen that upon operation of the universal bar the rigid dog-plate $m^2$ will be depressed to bring the rigid dog $m'$ into engagement with the ratchet-wheel $m^9$. During such movement of the rigid dog-plate $m^2$ the curved lower face of its depending portion $m^3$ will engage the pin $m^{15}$ on the loose dog-plate $m^4$ and swing the loose dog to the right (see Fig. 12) in an arc about the pin $m^6$. Upon return of the universal bar to its normal position the rigid dog-plate $m^2$ will be raised to withdraw its rigid dog $m'$ from engagement with the ratchet-wheel, and the spring $m^{16}$, connected to the rigid and loose dog-plates will maintain the loose dog $m^8$ in engagement with the ratchet-wheel. The type-writer carriage will then be transversely moved by any usual carriage-actuating means until the gear-wheel O, which engages the stationary feed-rack B, causes sufficient rotation of the spindle R and ratchet-wheel $m^9$ to swing the loose dog-plate $m^4$ against an adjustable stop P. As shown, especially in Fig. 12, the adjustable stop P is formed with stepped portions and is supported on a spindle $p$ to provide means for adjusting any of said step portions in operative positions relatively to the loose dog $m^4$, whereby the travel of the type-writer carriage can be regulated to produce single space, double space, or a greater travel, if desired.

In Figs. 22 and 23 I have shown a device for effecting tensioning of the power-spring, which is employed for causing transverse travel of the carriage A on its supporting-tracks $a^3$ $a^4$ and comprises a wheel Q, formed with a central hub $q$, which is provided with serrations or teeth $q^2$ to be engaged by corresponding serrations or teeth $q^3$, formed in the shank $q^4$ of a thumb-nut $q^5$. A chamber $q^6$ is provided in said nut for housing the headed end $q^7$ of a pin $q^8$, which penetrates the hub $q$ and has secured to its opposite end a pinion $q^9$, meshing with a gear-wheel $q^{10}$. Encircling the headed end of the pin $q^8$ is a spring $q^{11}$. It is to be understood that the raising of the thumb-nut effects its disengagement from the serrations in the hub of the wheel Q and puts the spring $q^{11}$ under stress. By this means the pinion $q^9$ may be rotated in either direction and effect turning of the gear-wheel $q^{10}$ to effect tensioning of a power-spring (not shown) connecting with the carriage at one end and winding upon a drum (also not shown) with which said wheel Q is secured. The serrations in the hub and the nut lock the pinion against movement.

Having thus described my invention, what I claim as new, and desire to secure by Letters Patent, is—

1. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermediate of its length and by which it is positioned relative to the feed-rack, means constructed to rock said rocking member longitudinally to said feed-rack to permit limited travel of the supporting part in a direction longitudinally of the feed-rack, independent means constructed to effect tilting of the bearing member axially out of engagement with said feed-rack to permit free travel of the supporting part longitudinally of the feed-rack.

2. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermediate of its length and by which it is positioned relative to the feed-rack, means constructed to rock said rocking member longitudinally to said feed-rack to permit limited travel of the supporting part in a direction longitudinally of the feed-rack, independent means constructed to effect tilting of the bearing member axially out of engagement with said feed-rack to permit free travel of the supporting part longitudinally of the feed-rack, and means for automatically effecting reshifting of the dog mechanism into engagement with the feed-rack.

3. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermediate of its length and by which it is positioned relative to the feed-rack, means constructed to rock said rocking member longitudinally to said feed-rack to permit limited travel of the supporting part in a direction longitudinally of the feed-rack, independent means constructed to effect tilting of the bearing member axially out of engagement with said feed-rack to permit free travel of the supporting part longitudinally of the feed-rack, and spring-actuated means for automatically effecting reshifting of the dog mechanism into engagement with the feed-rack.

4. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermediate of its length and by which it is positioned relative to the feed-rack, means constructed to rock said rocking member longitudinally to said feed-rack to permit limited travel of the supporting part in a direction longitudinally of the feed-rack, means constructed and arranged to vary the extent of said limited travel, independent means constructed to effect tilting of the bearing member axially out of engagement with said feed-rack to permit free travel of the supporting part longitudinally of the feed-rack.

5. In a feed mechanism, the combination of a movable part, a feed-rack supported adjacent thereto, a combined longitudinally and transversely rocking dog mechanism carried by said movable part in position to engage said feed-rack, means constructed to rock said dog mechanism longitudinally to permit limited travel of the movable part in a direction longitudinally of the feed-rack, means mounted separately from the dog mechanism and constructed to vary the extent of said limited movement, and means constructed to rock said dog mechanism transversely out of engagement with the feed-rack, substantially as described.

6. In a feed mechanism, the combination with a movable part, of a feed-rack supported adjacent thereto, a combined longitudinally and transversely rocking dog mechanism carried by said movable part in position to engage said feed-rack, means constructed to rock said dog mechanism to permit limited travel of the movable part in a direction longitudinally of the feed-rack, means disposed on the movable part, independent of the dog mechanism and constructed to vary the extent of said limited movement, and means constructed to rock said dog mechanism out of engagement with the feed-rack to effect general release of the dog mechanism, substantially as described.

7. In a feed mechanism, the combination of a movable part, a feed-rack supported adjacent thereto, dog mechanism carried by said movable part in position to engage said feed-rack, means constructed to rock said dog mechanism in the plane of the rack to permit limited travel of the movable part in a direction longitudinally of the feed-rack, means mounted separately from and movable into longitudinal alinement with the dog mechanism constructed and arranged to vary the extent of said limited movement, and means for positioning said varying means, substantially as described.

8. In a feed mechanism, the combination of a movable part, a feed-rack supported adjacent thereto, a combined longitudinally and transversely rocking dog mechanism carried by said movable part in position to engage said feed-rack, means constructed to rock said dog mechanism to permit limited travel of the movable part in a direction longitudinally of the feed-rack, a movable abutment for regulating the extent of said limited movement, means for positioning said abutment, and means constructed to rock said dog mechanism out of engagement with said feed-rack to permit free travel of the movable part longitudinally of the feed-rack, substantially as described.

9. In a feed mechanism, the combination of a movable part, a feed-rack supported adjacent thereto, a combined longitudinally and transversely rocking dog mechanism carried by said movable part in position to engage said feed-rack, means constructed to rock said dog mechanism to permit limited travel of the movable part in a direction longitudinally of the feed-rack, a slidable abutment for regulating the extent of said limited movement, means for positioning said abutment, means constructed to rock said dog mechanism out of engagement with said feed-rack to permit free travel of the movable part longitudinally of the feed-rack, and means for effecting automatic shifting of the dog mechanism into engagement with the rack, substantially as described.

10. In a feed mechanism, the combination of a movable part, a feed-rack supported adjacent thereto, a combined longitudinally and transversely rocking dog mechanism carried by said movable part in position to engage said feed-rack, means constructed to rock said dog mechanism to permit limited travel of the movable part in a direction longitudinally of the feed-rack, means constructed to rock said dog mechanism transversely to said feed-rack to permit free travel of the movable part longitudinally of the feed-rack, and means arranged independent of the dog mechanism to lock the parts thereof in their normal relative positions when so shifted, substantially as described.

11. In feed mechanism, the combination with a movable part and a feed-rack supported adjacent thereto, of a combined longitudinally and transversely rocking dog mechanism carried by said movable part in position to engage the feed-rack, means constructed to actuate said dog mechanism longitudinally to said feed-rack to permit limited travel of the movable part in a direction longitudinally of the feed-rack, means constructed to rock transversely said dog mechanism out of engagement with the feed-rack to permit free travel of the movable part longitudinally thereof, and means disposed on the movable part, normally disengaged from the dog mechanism, and constructed to engage with and lock the parts of the dog mechanism in their normal relative positions when so shifted, substantially as described.

12. In feed mechanism, the combination with a movable part and a feed-rack supported adjacent thereto, of a combined longitudinally and transversely rocking dog mechanism fulcrumed intermediate of its length for rocking movement and carried by the movable part in position to engage said feed-rack, means constructed to rock said dog mechanism longitudinally to said feed-rack to permit limited travel of the movable part in a direction longitudinally of the feed-rack, means constructed to tilt said dog mechanism at right angles to its longitudinal axis to position it out of engagement with the feed-rack, and means carried by the movable part, normally out of the path of operating movement of the dog mechanism, and arranged to be engaged by the dog mechanism to lock the parts thereof in their normal relative positions while shifted, substantially as described.

13. In feed mechanism, the combination with a movable part and a feed-rack supported adjacent thereto, of a combined longitudinally and transversely rocking dog mechanism carried by the movable part in position to engage said feed-rack, means constructed to rock said dog mechanism longitudinally to said feed-rack to permit limited travel of the movable part in a direction longitudinally of the feed-rack, means constructed to tilt said dog mechanism at right angles to its longitudinal axis to position it out of engagement with the feed-rack, and a guiding member carried by the movable part, normally out of the path of operating movement of the dog mechanism, and operable only when the parts are tilted out of engagement with the feed-rack and arranged to lock the parts of the dog mechanism in their normal relative positions when so shifted, substantially as described.

14. In a feed mechanism, the combination of a movable part, a feed-rack supported adjacent thereto, dog mechanism carried by said movable part in position to engage said feed-rack, means constructed to actuate said dog mechanism to permit limited travel of the movable part in a direction longitudinally of the feed-rack, means constructed and arranged to vary the extent of said limited movement, means constructed to shift said dog mechanism transversely to said feed-rack to permit free travel of the movable part longitudinally of the feed-rack, and means arranged to engage said dog mechanism and lock the parts thereof in their normal relative positions when so shifted, substantially as described.

15. In a feed mechanism, the combination of a movable part, a feed-rack supported adjacent thereto, a combined longitudinally and transversely rocking dog mechanism carried by said movable part in position to engage said feed-rack, means constructed to rock said dog mechanism longitudinally to said feed-rack to permit limited travel of the movable part in a direction longitudinally of the feed-rack, means constructed to rock said dog mechanism transversely to said feed-rack to permit free travel of the movable part longitudinally of the feed-rack, and a guiding member arranged to engage said dog mechanism to hold the parts of the dog mechanism against actuation and retain them, positively, in their normal relative positions when so shifted, said guiding member constructed to automatically guide said dog mechanism during return of the latter to reengagement with the feed-rack, substantially as described.

16. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, and an abutment-bar, independent of the rocker-block, carried by said movable part and constructed to be moved into and out of the path of the loose dog to regulate the extent of said extreme movement of the loose dog, substantially as described.

17. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free loose dog from engagement with the feed-rack and to shift the rigid dog into engagement therewith, means constructed to maintain the loose dog in its extreme position from the rigid dog upon release of the former from the feed-rack, and an abutment-bar, independent of the rocker-block, carried by said movable part and constructed to be moved into and out of the path of the dog mechanism to regulate the extent of said extreme movement of the loose dog, substantially as described.

18. In a feed mechanism, the combination with a movable part and a feed-rack supported adjacent thereto, of a rocker-block carried on the movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, and means carried by the movable part, independent of the rocker-block, and movable into and out of the path of the loose dog to regulate the extent of said extreme movement of the loose dog, substantially as described.

19. In a feed mechanism, the combination with a movable part and a feed-rack supported adjacent thereto, of a rocker-block carried on the movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, means carried by the movable part, independent of the rocker-block, and movable into and out of the path of the loose dog to regulate the extent of said extreme movement of the loose dog, and means for positioning said regulating means, substantially as described.

20. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, adjustable means carried by said movable part independent of the dog mechanism and constructed to regulate the extent of said extreme movement of the loose dog, and means constructed to rock both dogs away from engagement with said feed-rack, whereby a position of general release will be obtained to permit free travel of said movable part in either direction, substantially as described.

21. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, adjustable means carried by said movable part and constructed to regulate the extent of said extreme movement of the loose dog, means constructed to shift said rocker-block to simultaneously release both of said dogs from said feed-rack, and means arranged to engage said dog mechanism and lock the loose dog in its normal position relative to the rigid dog when so shifted, substantially as described.

22. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, means constructed to automatically maintain the loose dog in engagement with the feed-rack and the rigid dog free therefrom, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, adjustable means carried by said movable part and constructed to regulate the extent of said extreme movement of the loose dog, means constructed to shift said rocker-block to simultaneously release both of said dogs from said feed-rack, and means arranged to engage said dog mechanism and lock the loose dog in its normal position relative to the rigid dog when so shifted, said engaging means constructed to automatically guide the loose dog into engagement with the feed-rack upon return of the rocker-block to its normal position, substantially as described.

23. In a feed mechanism, the combination of a movable part, a feed-rack supported adjacent thereto, a combined vertically-reciprocating and transversely-tiltable rocker-block carried on said movable part and provided with a rigid dog, a dog-plate slidably mounted on said rocker-block and carrying a dog constituting the loose dog of the feed mechanism, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, slidable means carried by said movable part normally out of the path of travel of the slidable dog-plate and constructed to be moved into and out of the path of the dog mechanism to regulate the extent of said extreme movement of the loose dog, and adjustable means constructed to limit the approach of the loose dog to the rigid dog, substantially as described.

24. In a feed mechanism, the combination of a movable part, a feed-rack supported adjacent thereto, a combined vertically-reciprocating and transversely-tiltable rocker-block carried on said movable part and provided with a rigid dog, a dog-plate slidably mounted on said rocker-block and carrying a dog constituting the loose dog of the feed mechanism, means constructed to rock said rocker-block to free the loose dog from engagement with the feed-rack and to shift the rigid dog into engagement therewith, means constructed to maintain the loose dog in its extreme position from the rigid dog upon release of the former from the feed-rack, adjustable means carried by said movable part normally out of the path of travel of the slidable dog-plate and constructed to be moved into and out of the path of the dog mechanism to regulate the extent of said extreme movement of the loose dog, and adjustable means carried by said loose dog and constructed to limit the approach of the loose dog to the rigid dog, substantially as described.

25. In a feed mechanism, the combination of a movable part, a feed-rack supported adjacent thereto, a bearing-yoke rockingly supported on said movable part, a rocker-block fulcrumed intermediate of its length in said bearing-yoke and constructed to be rocked alternately to raise and lower its ends and provided with a rigid dog, a dog-plate slidably mounted on said rocker-block and carrying a dog constituting the loose dog of the feed mechanism, means constructed to rock said rocker-block on said bearing-yoke to free the loose dog from engagement with the feed-rack and to shift the rigid dog into engagement therewith, and means constructed to swing said bearing-yoke to simultaneously shift both the rigid and loose dogs from engagement with the feed-rack, and separate means for returning the dogs into reëngagement with the rack, substantially as described.

26. In a feed mechanism, the combination of a movable part, a feed-rack supported adjacent thereto, a bearing-yoke rockingly supported on said movable part, a rocker-block journaled on said bearing-yoke and provided with a rigid dog, a dog-plate slidably mounted on said rocker-block and carrying a dog constituting the loose dog of the feed mechanism, means constructed to rock said rocker-block on said bearing-yoke to free the loose dog from engagement with the feed-rack and to shift the rigid dog into engagement therewith, means constructed to swing said bearing-yoke to simultaneously shift both the rigid and loose dogs from engagement with the feed-rack, and means arranged independent of the bearing-yoke to engage said dog mechanism and lock the loose dog in its normal position relative to the rigid dog when so shifted, substantially as described.

27. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, an adjustable stop carried by said rocker-block, and actuating means constructed to engage said adjustable stop for actuating the rocker-block to free the loose dog from engagement with the feed-rack and to shift the rigid dog into engagement therewith, said actuating means arranged to be normally held from engagement with said adjustable stop and to engage the same after passing through a predetermined portion of its path, substantially as described.

28. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, an adjustable stop carried by said rocker-block, actuating means constructed to engage said adjustable stop for actuating the rocker-block to free the loose dog from engagement with the feed-rack and to shift the rigid dog into engagement therewith, said actuating means arranged to be normally held from engagement with said adjustable stop and to engage the same after passing through a predetermined portion of its path, and means constructed to maintain the loose dog in its extreme position from the rigid dog upon release of the former from the feed-rack, substantially as described.

29. In a feed mechanism, the combination of a movable part, a feed-rack supported adjacent thereto, a rocker-block carried on said movable part and provided with a rigid dog, a dog-plate slidably mounted on said rocker-block and carrying a dog constituting the loose dog of the feed mechanism, an adjustable stop carried by said rocker-block, actuating means constructed to engage said adjustable stop for actuating the rocker-block to free the loose dog from engagement with the feed-rack and to shift the rigid dog into engagement therewith, said actuating means arranged to be normally held from engagement with said adjustable stop and to engage the same after passing through a predetermined portion of its path, means constructed to maintain the loose dog in its extreme position from the rigid dog upon release of the former from the feed-rack, and adjustable means carried by said movable part and constructed to regulate the extent of said extreme movement of the loose dog, substantially as described.

30. In a feed mechanism, the combination of a movable part, a feed-rack supported adjacent thereto, dog mechanism carried by said movable part in position to engage said feed-rack and comprising a rigid dog and a loose dog, each dog disposed to be alternately in engagement with the feed-rack, movable supporting-blocks for the dogs, means carried by the dog-supporting blocks and constructed to throw both dogs into simultaneous engagement with the feed-rack when the movable part is moved in an opposite direction to its normal travel.

31. In a type-writer, letter-spacing mechanism, the combination of a movable part, a feed-rack supported adjacent thereto, a rigid dog and a loose dog constructed alternately to engage said feed-rack for regular spacing, movable supporting-blocks for said rigid and loose dogs, and back-space means constructed to effect engagement and locking of both dogs, simultaneously, with said feed-rack when the movable part is moved back in an opposite direction to its regular travel, and operating automatically to effect repositioning of the parts for further, regular letter-spacing.

32. In a feed mechanism, the combination of a movable part, a feed-rack supported adjacent thereto, a rocker-block, a rigid dog carried by the rocker-block, a dog-block sliding on and movable with the rocker-block, a dog carried by the dog-block and constituting the loose dog of the feed mechanism, and means carried by both blocks and coacting to tilt the rocker-block to project the rigid dog into engagement with the feed-rack, without disengagement of the loose dog therewith.

33. In a type-writer, the combination with a feed-rack, of dog mechanism arranged to rock in the plane of the rack to effect step-by-step feeding, key-levers, a universal bar disposed to be operated directly thereby, a dog-mechanism actuator normally spaced from operative engagement with said mechanism, and connection between said actuator and the universal bar, whereby the universal bar and the dog-mechanism actuator are set in motion and then transmit the motion to the dog mechanism at a later point in the stroke of the key-lever.

34. In a type-writer, the combination with a traveling carriage and a feed-rack, of a dog mechanism arranged to rock in the plane of the rack to effect feeding of the carriage, key-levers, a universal bar disposed to be operated directly thereby, a rocker-arm disposed to engage with said mechanism after a period of lost motion, and a link directly connecting the universal bar and said rocker-arm, whereby the universal bar and the rocker-arm are set in motion and then transmit the motion to the dog mechanism at a later period in the stroke of the key-lever.

35. In feed mechanism, the combination with a movable part and a feed-rack disposed adjacent thereto, of dog mechanism carried by the movable part and comprising a tiltable member, a dog-block constructed to oscillate in a vertical plane and to coact with the feed-rack and supported in and tiltable with said tiltable member to release the feed mechanism, and an independent rocker-bar engaging said dog mechanism and constructed to operate the same to cause it to engage the feed-rack but disposed to be unaffected by the tilting of the dog mechanism for release, substantially as described.

36. In feed mechanism, the combination with a movable part and a feed-rack disposed adjacent thereto, dog mechanism carried by the movable part and comprising a trunnion-plate carried by the movable part, a tiltable member supported in the trunnion-plate, a movable dog-block supported in the tiltable member to tilt therewith for release of the feed mechanism, and means engaging said dog mechanism and constructed to operate the same to effect its engagement with the feed-rack, substantially as described.

37. In feed mechanism, the combination with a movable part and a feed-rack disposed adjacent thereto, a trunnion-plate carried by the movable part, a member tiltable on the trunnion-plate to bring about release of the escapement mechanism, an oscillating dog-block mounted on the tiltable member, a slidable dog-block, and means engaging said oscillating dog-block for effecting alternate engagement of the dog-blocks with the feed-rack, substantially as described.

38. In feed mechanism, the combination with a movable part and a feed-rack disposed adjacent thereto, a trunnion-plate carried by the movable part, a tiltable member movably supported on the trunnion-plate, a rocking dog-block mounted on the tiltable member, and rocking in a plane at right angles to the plane of the tilting movement, a slidable dog-block, means engaging said dog-blocks for effecting their engagement with the feed-rack, and means for tilting the said member and dog-blocks away from the feed-rack, substantially as described.

39. In feed mechanism, the combination with a movable part and a feed-rack disposed adjacent thereto, a trunnion-plate carried by the movable part, a tiltable member movably supported on the trunnion-plate, movable dog-blocks supported in the tiltable member, means engaging one of said dog-blocks for effecting engagement of one of the blocks with, and disengagement of the other block from, the feed-rack, a rock-shaft engaging said tiltable member, and means connecting with said shaft and constructed to rock the same and tilt the dog mechanism out of engagement with the feed-rack, substantially as described.

40. In feed mechanism, the combination with a movable part and a feed-rack disposed adjacent thereto, a trunnion-plate carried by the movable part, a tiltable member movably supported on the trunnion-plate, dog-blocks mounted on the tiltable member, means engaging one of said dog-blocks for effecting engagement thereof with the feed-rack, a rock-shaft engaging said tiltable member, and mechanism connecting with said shaft and constructed to rock the same and tilt the dog mechanism out of engagement with the feed-rack, substantially as described.

41. In feed mechanism, the combination with a movable part and a feed-rack disposed adjacent thereto, of a transversely-tiltable member, means for movably supporting said member, dog-blocks rockingly supported in said member, a universal bar carried by said movable part, and a rocker-bar unconnected with the dog-blocks but connecting with said universal bar and engaging the rocking dog-blocks and constructed to rock said blocks during movement of the universal bar, substantially as described.

42. In feed mechanism, the combination with a movable part and a feed-rack disposed adjacent thereto, of a member tiltable to bring about release of the feed mechanism, means for movably supporting said member, dog mechanism rockingly supported in said member, a universal bar carried by said movable part, and a rocker-arm disposed adjacent to said member and connecting with the universal bar and engaging the dog mechanism to rock the same, said arm being mounted in such manner as to be unaffected by the tilting of the dog mechanism for release, substantially as described.

43. In feed mechanism, the combination with a movable part and a feed-rack disposed adjacent thereto, of a transversely-tiltable member, means carried by the movable part for tiltably supporting the said member, blocks rockingly supported on the tiltable member, means for tilting the member and dog-blocks away from a vertical line, means for limiting the extent of tilt of said member, an oscillating member disconnected from but engaging with said dog-blocks for rocking the same into engagement with the feed-rack, substantially as described.

44. In feed mechanism, the combination with a movable part and a feed-rack disposed adjacent thereto, of a transversely-tiltable member, means carried by the movable part for supporting the tiltable member, dog-blocks rockingly supported on the tiltable member, means for tilting the member and dog-blocks away from a vertical line, an inclined shoulder formed on the tilting member and engaging its support for limiting the tilt of said member, and means disconnected from but engaging with said dog-blocks for rocking the same into engagement with the feed-rack, substantially as described.

45. In feed mechanism, the combination with a movable part and a feed-rack disposed adjacent thereto, of a tiltable member, means carried by the movable part for supporting the tiltable member, dog-blocks rockingly supported on the tiltable member, means for tilting the member and dog-blocks transversely away from a perpendicular line, means associated with the tiltable member and its support and constructed to limit the extent of tilt of said member, an oscillating member disconnected from but engaging with said dog-blocks for rocking the same into engagement with the feed-rack, and means for returning the tiltable member from its shifted position, substantially as described.

46. In feed mechanism, the combination with a movable part and a feed-rack disposed adjacent thereto, of a tiltable member, means carried by the movable part for supporting the tiltable member, dog-blocks rockingly supported on the tiltable member, means for tilting the member and dog-blocks away from a vertical line simultaneously, means for limiting the extent of tilt of said member, means disconnected from but engaging with said dog-blocks for oscillating the same in to engagement with the feed-rack for spacing, means for returning the tiltable member from its shifted position, and means for limiting the backward movement of the tiltable member during its return, substantially as described.

47. In feed mechanism, the combination with a movable part and a feed-rack disposed adjacent thereto, a supporting member carried by the movable part, which supporting member is constructed to have movement out of the perpendicular plane of the feed-rack for releasing the feed mechanism, a rigid dog rocker-block supported on said member, a loose dog-block slidably mounted on said rocker-block, means for sliding said loose dog-block on the rocker-block and means for guiding said dog-block in its movement on the rocker-block, substantially as described.

48. In feed mechanism, the combination with a movable part and a feed-rack disposed adjacent thereto, a supporting member carried by the movable part, a rigid-dog rocker-block supported on said member, a loose dog-block slidably mounted on said rocker-block, means for sliding said loose dog-block on the rocker-block, and a slidable plate disposed independent of the dog-blocks and movable into the path of travel of the loose dog-block and constructed to limit its movement for single spacing and adjustable out of the path of movement thereof for permitting double spacing, substantially as described.

49. In feed mechanism, the combination with a movable part and a feed-rack disposed adjacent thereto, a supporting member carried by the movable part, a rigid-dog rocker-block supported on said member, a loose dog-block slidably mounted on said rocker-block, means for sliding said loose dog-block on the rocker-block, a slidable plate disposed independent of the dog-blocks and movable into the path of travel of the loose dog-block and constructed to limit its movement for single spacing and adjustable out of the path of movement thereof for permitting double spacing, and means for limiting the movement of said slidable plate, substantially as described.

50. In feed mechanism, the combination with a movable part and a feed-rack disposed adjacent thereto, a supporting member carried by the movable part, which supporting member is constructed to have movement out of the perpendicular plane of the feed-rack for releasing the feed mechanism, a rigid dog rocker-block supported on said member, a loose dog-block slidably mounted on said rocker-block, spring-actuated means for sliding said loose dog-block on the rocker-block, a slidable plate disposed independent of the dog-blocks and movable into the path of travel of the loose dog-block and constructed to limit its movement for single spacing and adjustable out of the path of movement thereof for permitting double spacing, and means for maintaining the slidable plate in operative position, substantially as described.

51. In feed mechanism, the combination with a movable part and a feed-rack disposed adjacent thereto, a supporting member carried by the movable part, a rocker-block supported on said member, a dog-block slidably mounted on said rocker-block, means for effecting sliding of said dog-block on the rocker-block, a slidable plate disposed adjacent to said slidable dog-block, an abutting lug carried by said slidable plate and constructed to be positioned in the path of movement of the slidable dog-block for limiting movement thereof for single spacing and movable out of the path thereof to permit greater movement of the slidable block for double spacing, and means engaging the rocker-block and constructed to cause engagement of the blocks with the feed-rack, substantially as described.

52. In feed mechanism, the combination with a movable part and a feed-rack disposed adjacent thereto, a supporting member carried by the movable part, a rocker-block supported on said member and having movement with said supporting member in one direction and, also, movement in a different direction, a dog-block slidably mounted on said rocker-block, means for effecting sliding of said dog-block on the rocker-block, a lug carried by the slidable block, and a sliding plate disposed independent of the dog-blocks and engaging said lug to limit movement of the slidable plate, substantially as described.

53. In feed mechanism, the combination with a movable part and a feed-rack disposed adjacent thereto, a supporting member carried by the movable part, a rocker-block supported on said member, a dog-block slidably mounted on said rocker-block, means for effecting sliding of said dog-block on the rocker-block, a beveled lug carried by the slidable block, and a sliding plate engaging said lug to limit movement of the slidable plate, substantially as described.

54. In feed mechanism, the combination with a movable part and a feed-rack disposed adjacent thereto, a supporting member carried by the movable part, a rocker-block mounted on said supporting member, a dog-block having sliding engagement with said rocker-block, shoulders formed on said sliding block for limiting movement thereof, and means independent of but constructed to be rocked into contact with said rocker-block for effecting engagement between said blocks and the feed-rack, substantially as described.

55. In feed mechanism, the combination with a movable part and a feed-rack disposed adjacent thereto, a supporting member carried by the movable part, constructed and arranged to be tilted out of the perpendicular plane of the feed-rack for releasing the feed mechanism, a rocker-block movably fulcrumed intermediate of its length on said supporting member and constructed to engage the feed-rack, a slidable block carried by the rocker-block and constructed also to have engagement with the feed-rack, means for effecting a sliding movement of said slidable block, and means for returning said sliding block to normal position, and an operating device constructed to have a lost-motion engagement with the rocker-block for actuating the same into engagement with the feed-rack, substantially as described.

56. In feed mechanism, the combination with a movable part and a feed-rack disposed adjacent thereto, a supporting member carried by the movable part, constructed and arranged to be tilted out of the perpendicular plane of the feed-rack for releasing the feed mechanism, a rocker-block movably fulcrumed intermediate of its length on said supporting member and constructed to engage the feed-rack, a slidable block carried by the rocker-block and constructed also to have engagement with the feed-rack, means for effecting a sliding movement of said slidable block, means for returning said sliding block to normal position, and means for limiting the forward movement of the slidable block, and an operating device constructed to have a lost-motion engagement with the rocker-block for actuating the same into engagement with the feed-rack, substantially as described.

57. In feed mechanism, the combination with a movable part and a feed-rack disposed adjacent thereto, a supporting member carried by the movable part, constructed and arranged to be tilted out of the perpendicular plane of the feed-rack for releasing the feed mechanism, a rocker-block movably fulcrumed intermediate of its length on said supporting member and constructed to engage the feed-rack, a slidable block carried by the rocker-block and constructed also to have engagement with the feed-rack, means for effecting a sliding movement of said slidable block, means for returning said sliding block to normal position, and means for limiting the backward movement of the slidable block, and an operating device constructed to have a lost-motion engagement with the rocker-block for actuating the same into engagement with the feed-rack, substantially as described.

58. In feed mechanism, the combination with a movable part and a feed-rack disposed adjacent thereto, a supporting member carried by the movable part, a rocker-block movably mounted on said supporting-block and constructed to engage the feed-rack, a slidable block carried by the rocker-block and constructed also to have engagement with the feed-rack, an arm carried by the rocker-block, and a spindle threaded in the loose block and sliding in said arm, substantially as described.

59. In feed mechanism, the combination with a movable part and a feed-rack disposed adjacent thereto, a supporting member carried by the movable part, a rocker-block movably mounted on said supporting member and constructed to engage the feed-rack, a slidable block carried by the rocker-block and constructed also to have engagement with the feed-rack, an arm carried by the rocker-block, and a headed spindle threaded in the loose block and sliding in said arm, substantially as described.

60. In feed mechanism, the combination with a movable part and a feed-rack disposed adjacent thereto, a supporting member carried by the movable part, a rocker-block movably mounted on said supporting member and constructed to engage the feed-rack, a slidable block carried by the rocker-block and constructed also to have engagement with the feed-rack, an arm carried by the rocker-block, and an adjustable spindle threaded in the loose block and sliding in said arm and means associated with the spindle and said arm and adapted to project the slidable block away from said arm, substantially as described.

61. In feed mechanism, the combination with a movable part and a feed-rack disposed adjacent thereto, a supporting member carried by the movable part, a rocker-block movably mounted on said supporting member and constructed to engage the feed-rack, a slidable block carried by the rocker-block and constructed also to have engagement with the feed-rack, an arm carried by the rocker-block, a spindle threaded in the loose block and sliding in said arm, and a spring encircling the spindle, substantially as described.

62. In feed mechanism, the combination with a movable part and a feed-rack disposed adjacent thereto, a supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, an arm carried by the rocker-block, a rocker-arm normally out of engagement with, but constructed to be actuated into contact with said arm for rocking the rocker-block, and means for operating the rocker-arm, substantially as described.

63. In feed mechanism, the combination with a movable part and a feed-rack disposed adjacent thereto, a supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, an arm carried by the rocker-block, a rocker-arm normally out of engagement with, but constructed to be actuated into contact with said arm for rocking the rocker-block, means for operating the rocker-arm, and means connecting with said arm and said movable part for returning the rocker-block after being operated by the rocker-arm, substantially as described.

64. In feed mechanism, the combination with a movable part and a feed-rack disposed adjacent thereto, a supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, means normally out of engagement, but constructed to be actuated into contact with the rocker-block for rocking the same, and means for limiting the extent of rocking of said rocker-block, substantially as described.

65. In feed mechanism, the combination with a movable part and a feed-rack disposed adjacent thereto, a supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, means normally out of engagement, but constructed to be actuated into contact with the rocker-block for rocking the same, and adjustable means for limiting the extent of rocking of said rocker-block, substantially as described.

66. In feed mechanism, the combination with a movable part and a feed-rack disposed adjacent thereto, a tiltable supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, a rocker-arm disposed adjacent to, and normally out of engagement with said rocker-block and constructed to engage the same to rock it, and means engaged by the rocker-arm for limiting the amount of rocking of the rocker-block, said rocker-block being movable in one direction with the tiltable block and, also, movable in a different direction independent of the tiltable movement of said tiltable member, substantially as described.

67. In feed mechanism, the combination with a movable part and a feed-rack disposed adjacent thereto, a supporting member carried by the movable part, a rocker-block fulcrumed intermediate of its length on said supporting member and arranged to be rocked to position its extremities, alternately, contiguous to the lower face of the feed-rack, a slidable block carried by the rocker-block and constructed also to have engagement with the feed-rack, a rocker-arm disposed adjacent to, and normally out of engagement with said rocker-block and constructed to engage the same to rock it, and adjustable means engaged by the rocker-arm for limiting the amount of rocking of the rocker-block, substantially as described.

68. In feed mechanism, the combination with a movable part and a feed-rack disposed adjacent thereto, of a tiltable member carried by the movable part, a rocker-block supported on the tiltable member and constructed to engage the feed-rack, a loose dog-block slidably carried by said rocker-block and also constructed to engage the feed-rack, means for moving said tiltable member and blocks out of engagement with the feed-rack, and a loose dog-block-positioning guide, normally out of the path of said block and constructed to engage and hold the same against further sliding movement when the tiltable member is tilted, substantially as described.

69. In feed mechanism, the combination with a movable part and a feed-rack disposed adjacent thereto, of a tiltable member carried by the movable part, a rocker-block supported on the tiltable member and constructed to engage the feed-rack, a loose dog-block slidably carried by said rocker-block and also constructed to engage the feed-rack, means for moving said tiltable member and blocks out of engagement with the feed-rack, and a loose dog-block-positioning guide carried by and upstanding from the movable part, normally out of the path of said block, and constructed to engage and hold the same against further sliding movement when the tiltable member is tilted, substantially as described.

70. In feed mechanism, the combination with a movable part and a feed-rack disposed adjacent thereto, of a tiltable member carried by the movable part, a rocker-block supported on the tiltable member and constructed to engage the feed-rack, a loose dog-block slidably carried by said rocker-block and also constructed to engage the feed-rack, means for moving said tiltable member and blocks out of engagement with the feed-rack, means constructed to thrust and maintain the loose dog in its extreme position from the rigid dog upon the release of the former from the feed-rack and a stationary positioning-guide, normally out of the path of said block, and constructed to engage the block when in its nearest position to the rigid dog and hold the block against further sliding movement when the tiltable member is tilted, substantially as described.

71. In a feed mechanism, the combination with a movable part and a feed-rack disposed adjacent thereto, of a tiltable member supported on the movable part, a rocker-block supported on the tiltable member and constructed to engage the feed-rack, a slidable block carried by the rocker-block and constructed to engage the feed-rack, a rocker-arm disposed independent of the tiltable member and constructed to engage and actuate the rocker-block, and means for tilting said member and blocks away from the feed-rack without effecting operation of the rocker-arm, substantially as described.

72. In a feed mechanism, the combination with a movable part and a feed-rack disposed adjacent thereto, of a tiltable member supported on the movable part, a rocker-block supported on the tiltable member and constructed to engage the feed-rack, a slidable block carried by the rocker-block and constructed to engage the feed-rack, a rocker-arm disposed independent of the tiltable member and constructed to engage and actuate the rocker-block, means for tilting said member and blocks away from the feed-rack without effecting operation of the rocker-arm, and means for returning the tiltable member to normal position, substantially as described.

73. In a feed mechanism, the combination with a movable part and a feed-rack disposed adjacent thereto, of a tiltable member supported on the movable part, a rocker-block supported on the tiltable member and constructed to engage the feed-rack, a slidable block carried by the rocker-block and constructed to engage the feed-rack, a rocker-arm disposed independent of the tiltable member and constructed to engage and actuate the rocker-block, means for tilting said member and blocks away from the feed-rack without effecting operation of the rocker-arm, and spring-actuated means for returning the tiltable member to normal position, substantially as described.

74. In feed mechanism, the combination with a movable part and a feed-rack disposed adjacent thereto, of a tiltable member carried by the movable part, a rocker-block rockingly supported on said tiltable member and constructed to engage the feed-rack, a slidable block supported on said rocker-block and constructed to engage the feed-rack, means for rocking the rocker-block, means for tilting the tiltable member and said block out of engagement with the feed-rack, and means for returning the tiltable member and said blocks to normal position in engagement with the rack, said means serving, also, to operate the rocker-block after the same has been rocked by said rocking means, substantially as described.

75. In feed mechanism, the combination with a movable part and a feed-rack supported adjacent thereto, of dog mechanism comprising a plurality of dogs constructed to be rocked alternately in a vertical plane to effect operative engagement of one or the other of the dogs with the feed-rack for spacing, a rocker-shaft engaging the dog mechanism and constructed to be rocked to tilt the plurality of dogs, simultaneously, away from a vertical plane, and out of engagement with the rack to permit travel of the movable part longitudinally of the feed-rack, and a rocker-arm fulcrumed independent of the rocker-shaft and normally unconnected with the dog mechanism, but constructed to be rocked into engagement with the dog mechanism and oscillate the same substantially as described.

76. In a type-writer, the combination with a carriage, of a feed-rack extending in the direction of travel of said carriage, a rocking dog mechanism underlying said feed-rack and comprising a rigid dog and a loose dog, one of which is normally in engagement with the rack but normally displaceable therefrom to effect engagement of the other dog with the rack, means for enabling said dog mechanism to perform variable spacing, said dog mechanism being pivoted intermediate of its length to perform a rocking movement relative to the feed-rack, abutment devices arranged to limit movement of said dog mechanism and operating, when said carriage is given a slight retrograde movement, to rock said dog mechanism and permit sliding of the normally engaged dog upon the rack without complete disengagement thereof and, at the same time, cause the locking engagement of the other dog with the rack at the conclusion of a movement corresponding to the feed determined by said variable-space means.

77. In a type-writer, the combination with a carriage, a feed-rack disposed adjacent thereto, dog mechanism constructed to have two movements in different directions relative to the feed-rack, a tiltable member arranged to support dog mechanism for movement in one direction, a rocking member supported by the tiltable member and constructed to be moved in a direction different from the movement of the tiltable member, means for effecting engagement of the dog mechanism in a direction in opposition to the face of said feed-rack, for spacing purposes, and means for tilting said tiltable member in a direction transverse to the feed-rack for releasing said feed mechanism from the feed-rack, substantially as described.

78. In a type-writer, the combination with a carriage, a feed-rack disposed in juxtaposition to the carriage, a rocker-block fulcrumed toward its center intermediate of its length and carrying toward one end thereof a dog, a slidable block movably supported on said rocker-block and carrying a dog toward one end thereof, the said dogs carried by the rocker and slidable blocks being at opposite sides of the fulcrum-point of the rocker-block, a rocker-arm unconnected with the rocker-block but arranged to be oscillated to engage therewith contiguous to one end of the block to position its dog in engagement with the feed-rack, and means independent of the rocker-arm for positioning the dog on the slidable block for engagement with the feed-rack.

79. In a type-writer, the combination with a carriage, a feed-rack disposed in juxtaposition to the carriage, a rocker-block fulcrumed toward its center, intermediate of its length and carrying toward one end thereof a dog, a slidable block movably supported on said rocker-block and carrying a dog toward one end, the said dogs carried by the slidable and rocker blocks being at opposite sides of the fulcrum-point of the rocker-block, means for rocking the rocker-block to effect engagement, first, of its dog with the feed-rack and, then, of the dog on the slidable block, means for effecting a longitudinal slidable movement of the slidable block independent of the movement of the rocker-block, and a tiltable member for supporting the rocker-block, substantially as described.

80. In a type-writer, the combination with a carriage, a feed-rack disposed in juxtaposition to the carriage, a rocker-block fulcrumed toward its center, intermediate of its length and carrying toward one end thereof a dog, a slidable block movably supported on said rocker-block and carrying a dog toward one end, the said dogs carried by the rocker and slidable blocks being at opposite sides of the fulcrum-point of the rocker-block, means for rocking the rocker-block to effect engagement, first, of its dog with the feed-rack and, then, of the dog on the slidable block, resilient means for effecting a longitudinal slidable movement of the slidable block independent of the movement of the rocker-block, a tiltable member for supporting the rocker-block, and means for effecting tilting of said member to disengage both dogs from the rack, substantially as described.

81. In a type-writer, the combination with a carriage, a feed-rack disposed in juxtaposition to the carriage, a rocker-block fulcrumed toward its center, intermediate of its length and carrying toward one end thereof a dog, a slidable block movably supported on said rocker-block and carrying a dog toward one end, the said dogs carried by the rocker and slidable blocks being at opposite sides of the fulcrum-point of the rocker-block, means for rocking the rocker-block to effect engagement, first, of its dog with the feed-rack and, then, of the dog on the slidable block, means for effecting a longitudinal slidable movement of the slidable block independent of the movement of the rocker-block, a tiltable member for supporting the rocker-block, means for effecting tilting of said member to disengage both dogs from the rack, and means engaging the slidable block and constructed to hold the same during such tilting and to guide its dog-block into operative engagement with the rack without permitting operation of the dog-carrying blocks for spacing, substantially as described.

82. In a type-writer, the combination with a carriage, a feed-rack disposed in juxtaposition to the carriage, a rocker-block fulcrumed toward its center, intermediate of its length and carrying toward one end thereof a dog, a slidable block movably supported on said rocker-block and carrying a dog toward one end, the said dogs carried by the rocker and slidable blocks being at opposite sides of the fulcrum-point of the rocker-block, means for rocking the rocker-block to effect engagement, first, of its dog with the feed-rack and, then, of the dog on the slidable block, means for effecting a longitudinal slidable movement of the slidable block independent of the movement of the rocker-block, a tiltable member for supporting the rocker-block, means for effecting tilting of said member to disengage both dogs from the rack, means engaging the slidable block and constructed to hold the same during such tilting and to guide its dog-block into operative engagement with the rack without permitting operation of the dog-carrying blocks for spacing, and a sliding abutment member constructed to be positioned into and out of the path of the slidable block to permit variable spacing, substantially as described.

83. In a type-writer, the combination with a carriage, a feed-rack disposed in juxtaposition to the carriage, a rocker-block fulcrumed toward its center, intermediate of its length and carrying toward one end thereof a dog, a slidable block movably supported on said rocker-block and carrying a dog toward one end, the said dogs carried by the rocker-block and by the slidable block being at opposite sides of the fulcrum-point of the rocker-block, lost-motion means for rocking the rocker-block to effect engagement, first, of its dog with the feed-rack and, then, of the dog on the slidable member, means for effecting a longitudinal slidable movement of the slidable block independent of the movement of the rocker-block, and independent means for limiting the movement of the dog-carrying blocks, substantially as described.

84. In a type-writer, the combination with a carriage, guide-rails upon which carriage is supported toward its sides, a feed-rack disposed intermediate of said guide-rails and parallel therewith, and dog mechanism disposed on said carriage also intermediate, approximately midway of said guide-rails and normally in engagement with said feed-rack and constructed to move the carriage longitudinally of the rails and center the weight of the carriage between the rails for prevention of transverse vibration, substantially as described.

85. In a type-writer, the combination with a writing-mechanism carriage, a feed-rack disposed adjacent to the carriage, a rocker-block fulcrumed toward its center, a dog mounted on said rocker-block, a slidable block having sliding engagement with the rocker-block, a dog mounted on the slidable block, block-oscillating means disposed contiguous to and normally out of engagement with the rocker-block, a universal bar disposed independent of the rocker-block, connections interposed between said universal bar and the rocker-block, oscillating means and key members constructed to impinge the universal bar and effect rocking of the rocker-block on its fulcrum to engage the dogs alternately with the feed-rack, substantially as described.

86. In a type-writer, the combination with a writing-mechanism carriage, a feed-rack disposed adjacent to the carriage, a rocker-block fulcrumed intermediate of its ends for rocking movement, a dog on said rocker-block, a slidable block supported on the rocker-block, a dog mounted on the slidable block, a rocking arm disposed contiguous to and normally out of engagement with the rocker-block, a universal bar, connections interposed between the rocking arm and the universal bar, and key members constructed to impinge the universal bar and effect reciprocal movement thereof and transmit movement to the rocking arm for actuating the dog-carrying blocks, substantially as described.

87. In a type-writer, the combination with a writing-mechanism carriage, guide-rails upon which said carriage travels, a feed-rack disposed adjacent to the carriage a handle disposed on the carriage, dog mechanism normally in engagement with the feed-rack, means for effecting total disengagement of the dog mechanism from the feed-rack to permit noiseless return of the carriage toward its starting-point, and a key member connecting with said disengaging means and disposed in proximity to the carriage-handle, substantially as described.

88. In a type-writer, the combination with a laterally-traveling carriage, a feed-rack member, a fulcrum member, a rocker-block supported on the fulcrum member, a dog mounted on the rocker-block, a slidable block, a dog mounted on the slidable block, a plurality of independent means for effecting movement, respectively, of the rocker-block and the slidable block to effect their alternate engagement with the feed-rack member, and means for effecting positioning of the dog-carrying blocks and the feed-rack member relative to each other for single, double and greater spacing, substantially as described.

89. In a type-writer, the combination with a laterally-traveling carriage, guide-rails disposed adjacent the upper portion of the carriage whereby said carriage is suspended from the guide-rails, a feed-rack disposed adjacent the carriage and independent of said guide-rails, dog mechanism coöperating with the feed-rack and constructed to be actuated to effect intermittent, spacing movement of the carriage and comprising an oscillating block, carrying a dog, a slidable block supported by the oscillating block and also carrying a dog, and key members for effecting actuation of said dog mechanism.

90. In a type-writer, the combination with a laterally-traveling carriage, guide-rails disposed adjacent the upper portion of the carriage whereby said carriage is suspended from the guide-rails, a feed-rack disposed adjacent the carriage and independent of said guide-rails, dog mechanism coöperating with the feed-rack and constructed to be actuated to effect intermittent, spacing movement of the carriage and comprising an oscillating block, carrying a dog, a slidable block supported by the oscillating block and also carrying a dog, key members for effecting actuation of said dog mechanism, and a rocker member normally unconnected with the oscillating member and constructed to be operated to engage the same.

91. In a type-writer, the combination with transverse guide-rails and a rectangular carriage-frame suspended therefrom, a feed-rack disposed parallel with but independent of said guide-rails, dog mechanism supported on said frame and comprising an oscillating block, a slidable block supported on the oscillating block, and an operating member normally out of engagement with said oscillating block and constructed to be operated to engage therewith, and means carried by said carriage-frame for effecting engagement of said operating member with said oscillating block and effecting engagement of said dog mechanism with the feed-rack to produce intermittent travel of the carriage on said guide-rails.

92. In a type-writer, transverse guide-rails, a carriage-frame suspended from the guide-rails and comprising a top plate, side plates, and a base-plate, dog mechanism disposed on the top plate, key members operating beneath the top plate, a carriage-handle disposed on one of the side plates, and a key member disposed in juxtaposition to the carriage-handle, and a feed-rack disposed adjacent to the carriage and independent of the guide-rails, and coöperating with the dog mechanism for effecting spacing of the carriage.

93. In a type-writer, a plurality of transverse round-faced guide-rails, a traveling carriage supported thereon and adapted to travel thereover, brackets secured to the traveling carriage, a plurality of V-shaped and flat-faced rollers supported on said brackets, a feed-rack disposed intermediate of said guide-rails, dog mechanism constructed to engage said feed-rack and comprising an oscillating block, a slidable block supported on the oscillating block, and an operating member normally out of engagement with the oscillating block and constructed to be actuated to engage therewith to oscillate the same.

94. In a type-writer, a transversely-traveling carriage, guide-rails disposed parallel to each other above the carriage and from which the carriage is suspended, a feed-rack disposed adjacent to the carriage and intermediate of the guide-rails, and dog mechanism disposed centrally of the carriage approximately midway between said parallel rails and coöperating with the feed-rack, and means for moving the carriage on its rails.

95. In a type-writer, the combination with a carriage, a feed-rack disposed adjacent to the carriage, a rocker-bar fulcrumed on the carriage, a dog mounted on the rocker-block and constructed to engage the feed-rack, a slidable block supported on the rocker-block, a dog mounted on the slidable block and constructed to engage the feed-rack, means for effecting sliding of the slidable block, means for tilting the rocker-block and the slidable block away from a vertical plane and out of engagement with the feed-rack, and means independent of the rocker and slidable blocks and constructed to engage the slidable block during the tilting of the rocker and slidable blocks and lock the slidable block against sliding during such tilting movement and to guide said block when the same is being returned to normal position, after being tilted out of engagement with the feed-rack, whereby movement of the slidable dog is prevented to effect spacing of the carriage, and whereby positioning of the dog on said slidable block in its original position in the feed-rack before tilting is effected.

96. In a type-writer, the combination with a laterally-traveling carriage, a feed-rack disposed adjacent to the carriage, a trunnion-plate supported on the carriage, a rocker-block fulcrumed in the trunnion-plate, a slidable block supported on the rocker-block independent of the trunnion-plate, a rocking arm normally out of engagement with the trunnion-plate and the rocker-block and constructed to be actuated to engage with the rocker-block, and means for operating said rocking arm.

97. In a type-writer, the combination with a carriage, a feed-rack disposed adjacent to the carriage, a tiltable fulcrum member, a rocker-block and a slidable bar coacting with the feed-rack, the rocker-block being pivoted intermediate of its length in said fulcrum member, and said slidable bar being supported on said rocker-block, means for moving said slidable bar, a rocking arm disposed adjacent to the rocker-block and independent thereof, and constructed to be moved into engagement with the rocker-block, and means for tilting the rocker-block for effecting movement of the rocking arm.

98. In a type-writer, dog mechanism comprising a rocker-block provided with a channel, a slidable block disposed in said channel, abutments formed on said slidable block and constructed to limit its movement, means carried by the rocker-block and constructed to actuate the slidable block longitudinally, a tiltable yoke member in which the rocker-block is supported, and means for actuating said rocker-block.

99. In a type-writer, dog mechanism comprising a rocker-block provided with a channel, a slidable block disposed in said channel, abutments formed on said slidable block and constructed to limit its movement, means carried by the rocker-block and constructed to actuate the slidable block longitudinally, a tiltable yoke member in which the rocker-block is supported, means for actuating said rocker-block, and means for changing the position of said abutments to vary the extent of movement of the slidable block.

100. In a type-writer, dog mechanism, comprising a rack, a tiltable fulcrum member, a plate in which said fulcrum member is supported, means carried by the fulcrum member and said plate for limiting movement of said member, a rocker-block pivoted in said fulcrum member, means for limiting the movement of said rocker-block in the fulcrum member, a dog mounted on said rocker-block, a slidable block disposed in said rocker-block, a dog mounted on said slidable block, means for effecting movement of said slidable block to position the dog mounted thereon away from the dog mounted on the rocker-block, means for limiting the extent of movement of said slidable block, a rocking arm disposed in juxtaposition to the rocker-block and constructed to be rocked into engagement with one end of said rocker-block and tilt that end to position its dog in engagement with the feed-rack, means engaging said rocker-block for withdrawing its dog out of engagement with the rack and to effect engagement with the rack of the dog on the slidable block, an abutment-plate normally out of engagement with the slidable block and constructed to be moved into the path thereof to reduce the length of its thrust, and means for tilting the fulcrum member to position the dogs mounted, respectively, on the rocker and slidable blocks out of engagement with the rack.

101. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermediate of its length and by which it is positioned relative to the feed-rack, means constructed to rock said rocking member longitudinally to said feed-rack to permit limited travel of the supporting part in a direction longitudinally of the feed-rack, means disposed independent of the dog mechanism and constructed and arranged to vary the extent of said limited travel, independent means constructed to effect tilting of the bearing member axially out of engagement with said feed-rack to permit free travel of the supporting part longitudinally of the feed-rack.

102. In a feed mechanism, the combination of a supporting part, a feed-rack supported adjacent thereto, a combined longitudinally and transversely rocking dog mechanism carried by the supporting part in position to engage said feed-rack and comprising a rocking member and a tiltable bearing member in which said rocking member is fulcrumed intermedate of its length and by which it is positioned relative to the feed-rack, means constructed to rock said rocking member longitudinally to said feed-rack to permit limited travel of the supporting part in a direction longitudinally of the feed-rack, means constructed and arranged to vary the extent of said limited travel, independent means constructed to effect tilting of the bearing member axially out of engagement with said feed-rack to permit free travel of the supporting part longitudinally of the feed-rack, and means for positioning said varying means.

In testimony whereof I affix my signature in the presence of two subscribing witnesses.

GEORGE W. DONNING.

Witnesses:
 JAMES S. GROSS,
 G. M. GOLLINS.